United States Patent [19]
Oliver

[11] Patent Number: 5,372,351
[45] Date of Patent: Dec. 13, 1994

[54] MANUAL OVERRIDE SYSTEM FOR ROTARY MAGNETICALLY OPERATED VALVE

[75] Inventor: John B. Oliver, Dartmouth, Canada

[73] Assignee: Nova Scotia Research Foundation Corporation, Dartmouth, Canada

[21] Appl. No.: 185,891

[22] PCT Filed: Jun. 3, 1992

[86] PCT No.: PCT/CA92/00233

§ 371 Date: Jan. 27, 1994

§ 102(e) Date: Jan. 27, 1994

[87] PCT Pub. No.: WO93/24778

PCT Pub. Date: Dec. 9, 1993

[51] Int. Cl.⁵ .................... F16K 31/05; F16K 31/08
[52] U.S. Cl. .................. 251/65; 251/129.03; 251/14
[58] Field of Search .............. 251/65, 129.03, 14

[56] References Cited

U.S. PATENT DOCUMENTS 3,279,744 10/1966 Fieldsen et al. .
3,687,415 8/1972 Turkot .
4,284,262 8/1981 Ruyak .
4,304,256 12/1981 Taiani .

*Primary Examiner*—Arnold Rosenthal
*Attorney, Agent, or Firm*—Jones, Tullar & Cooper

[57] ABSTRACT

A manual override for a magnetically operated rotary valve (10) is provided. The valve includes a rotary member connected to an internal carrier (18) that carries a plurality of permanent magnets (20). A rotary drive carrier (22) also carries a plurality of permanent magnets (24) and is separated from the internal carrier (18) by a hermetic barrier member (42). At one end the barrier member (42) is affixed to a rotatable plate member (26) that is held stationary by a removable pin (64) that interconnects the plate member (26) and a support member (56) affixed to the valve body (12). Rotation limit means are constituted by a pin (40) on the driven portion of the valve which is received in a cooperating recess (36) in the plate member (26). If the valve member jams and there is not sufficient magnetically-induced torque to free the valve member then the override of the invention will come into play. The removable pin (64) is removed and a lever (76) is attached to the plate member (26) to effect rotation thereof until there is engagement between the rotation limit means (40, 36). Continued rotation of the plate member (26) transfers rotative torque through the rotation limit means (36, 40) to the valve member until the valve member is freed. With the invention it is possible to transfer much more torque to the valve member than is normally available through the magnetic drive.

9 Claims, 3 Drawing Sheets

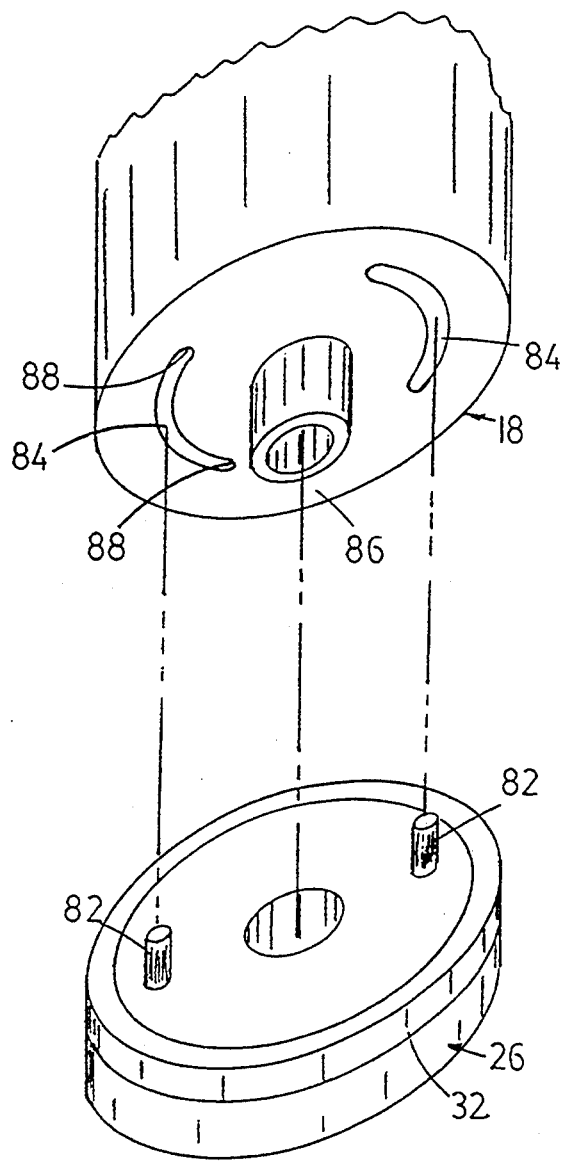
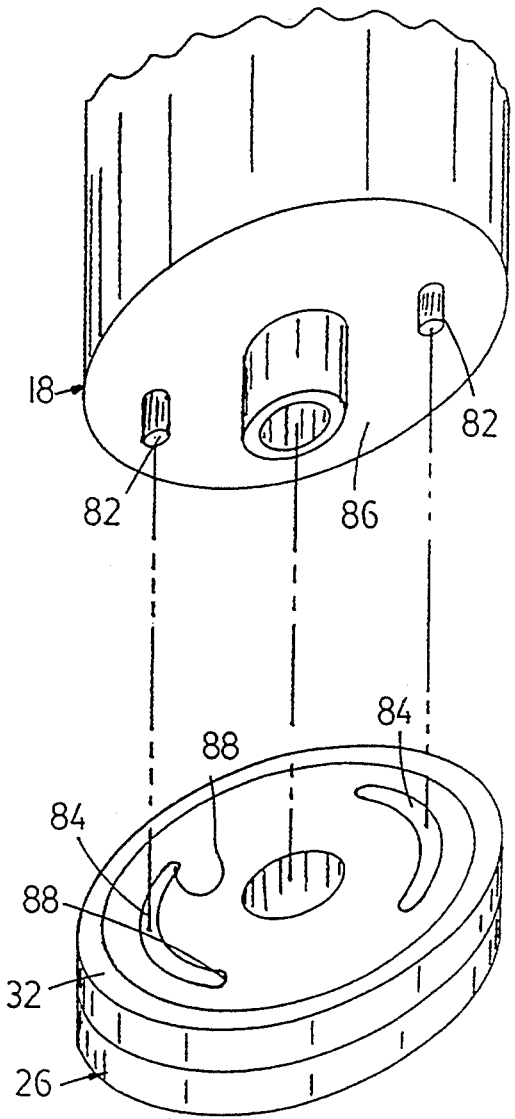
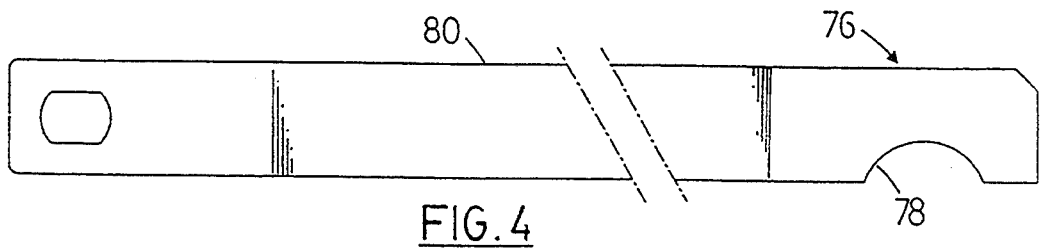

MANUAL OVERRIDE SYSTEM FOR ROTARY MAGNETICALLY OPERATED VALVE

The present invention relates in general to rotary magnetically operated valves and in particular to a manual override system for such valves.

BACKGROUND OF THE INVENTION

Rotary magnetically operated valves are well known, one such valve being disclosed in Canadian Patent No. 1,092,589 issued on Dec. 30, 1980 to Nova Scotia Research Foundation Corporation. Such a valve is used to control the flow of a substance such as a liquid or a gas, the valve having particular value when the fluid flowing therethrough is hazardous due to toxicity, radiation or corrosion. The valve of the Canadian patent has its valve member, e.g. a butterfly, attached to a valve stem which is rotatable on a rotation axis and which is also attached to a carrier. The carrier mounts a plurality of rare earth magnets about its outer periphery, with adjacent magnets having alternate polarity. The carrier is enclosed by a barrier member which is hermetically sealed to the valve body so that hazardous material passing through the valve is always contained within the barrier member and the valve body.

Externally of the barrier is another carrier, usually annular in shape, this carrier mounting another plurality of rare earth drive magnets about the internal circumference thereof, these magnets also being of alternating opposite polarity. A suitable means such as a handle, valve actuator or lever arm is provided to effect rotary movement of the drive carrier relative to the stationary barrier. Magnetic interaction across the barrier member causes the internal driven carrier to follow the rotary movement of the external drive carrier so that the valve member is rotated to progressively open or close the valve. Rotation limit means can be provided to prevent the valve member from rotating too far in the valve body.

Valves in accordance with the above patent are able to handle heavy flow volumes and the size of the valve member can be very large inasmuch as the magnetic drive can produce high torques. On occasion, however, a valve may jam and the torque available magnetically is not sufficient to overcome the jam. It is therefore imperative that there be some mechanism available to override the magnetic operation of the valve so that the valve can be either opened or closed by hand until such time as the fault which caused the jam can be rectified. Usually the fault is such that the valve must be dismantled, repaired, and rebuilt; otherwise there would have been no problem in the first place.

SUMMARY OF THE INVENTION

The present invention meets the above requirement by providing a system that will allow the valve member of a stuck valve to be rotated to an open or closed position shortly after a fault has been discovered and it has been determined that the valve member cannot be rotated in the usual magnetic manner. The elements of the present invention do not impact on the usual operation of the valve and in fact several years of operation may pass before the invention is called into play. However, given the substantial pressures that can be developed in hazardous environments, such as nuclear reactors, the availability of the present invention could save countless lives and prevent inestimable property damage by allowing an otherwise damaged valve to be operated so as to avoid an increasingly dangerous condition.

The present invention provides a modified valve construction wherein the barrier member is hermetically sealed to a lower plate member which is rotatable relative to the valve body. The plate member and the valve stem (or the internal carrier) have cooperating means that define rotation limit means. Normally the plate member will be held stationary by appropriate means, such as a removable pin, which interconnects the plate member and a support member fixed to the valve body. With the pin in place the valve member will move as required, following the movement of the drive magnets as they impart rotary movement to the driven magnets and their carrier. Such movement of the valve member will only be between the rotational limits established by the cooperating means mentioned above.

Typically the cooperating means will entail a pin carried by either the plate member or the valve stem (or the internal carrier) and a cooperating recess in the valve stem (or the internal carrier) or in the plate member, the recess having end walls against which the pin will abut at the rotation limits of the valve member.

Should the valve member jam for any reason and there not be enough torque available magnetically to rotate the valve member the manual override system of this invention can be used. The removable pin interconnecting the support member and the plate member is withdrawn to permit relative rotation between the plate member and the valve body. Then, a lever is attached to the plate member so that a rotative force can be applied thereto. Movement of the lever will rotate the plate member until there is abutment between the pin and the recess end wall of the rotation limiting means. Continued application of a rotative force on the lever should then cause the plate member and the valve member to rotate in concert due to the interaction of the rotation limiting means until the valve is either opened or closed as required.

Eventually, the flow of fluid to the valve in question should be stopped or diverted so that the valve can be isolated and repaired as necessary.

In summary therefore the present invention can be considered as providing a manual override system for a rotary magnetically operated valve assembly having a valve member rotatably located in a valve body on a rotation axis, a first carrier member connected to the valve member and mounting a peripheral set of driven magnets, a barrier member surrounding the carrier member and being hermetically sealed to a rotatable lower plate member of the assembly, a second carrier member surrounding the barrier member and mounting a set of drive magnets for magnetically inducing following rotary movement in the first carrier member and the valve member in response to specific rotary movement of the second carrier member, and rotation limit means cooperatively provided on the lower plate member and the first carrier member, the manual override system comprising: a support member fixed to the valve body; disengageable means normally interconnecting the support member and the lower plate member to hold the lower plate member stationary; and lever means engageable with the lower plate member following disengagement of the disengageable means for forcing rotation of the lower plate member and consequent rotation of the valve member through the limit means in the event that the drive magnets are unable to effect rotary movement of the driven magnets.

BRIEF DESCRIPTION OF THE DRAWINGS

FIG. 4 shows a plan view of a lever used with the present invention.

FIGS. 6A and 6B show other forms of rotation limit means.

DESCRIPTION OF THE PREFERRED EMBODIMENT

Figure 2:
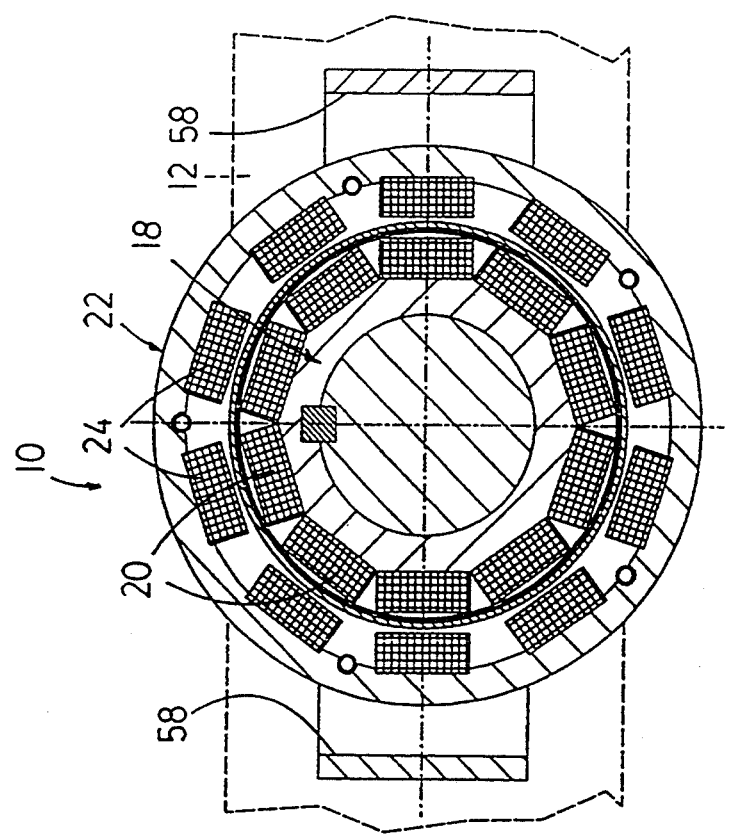
FIG. 2 shows a section on the line 2—2 of FIG. 1.
Figure 1:
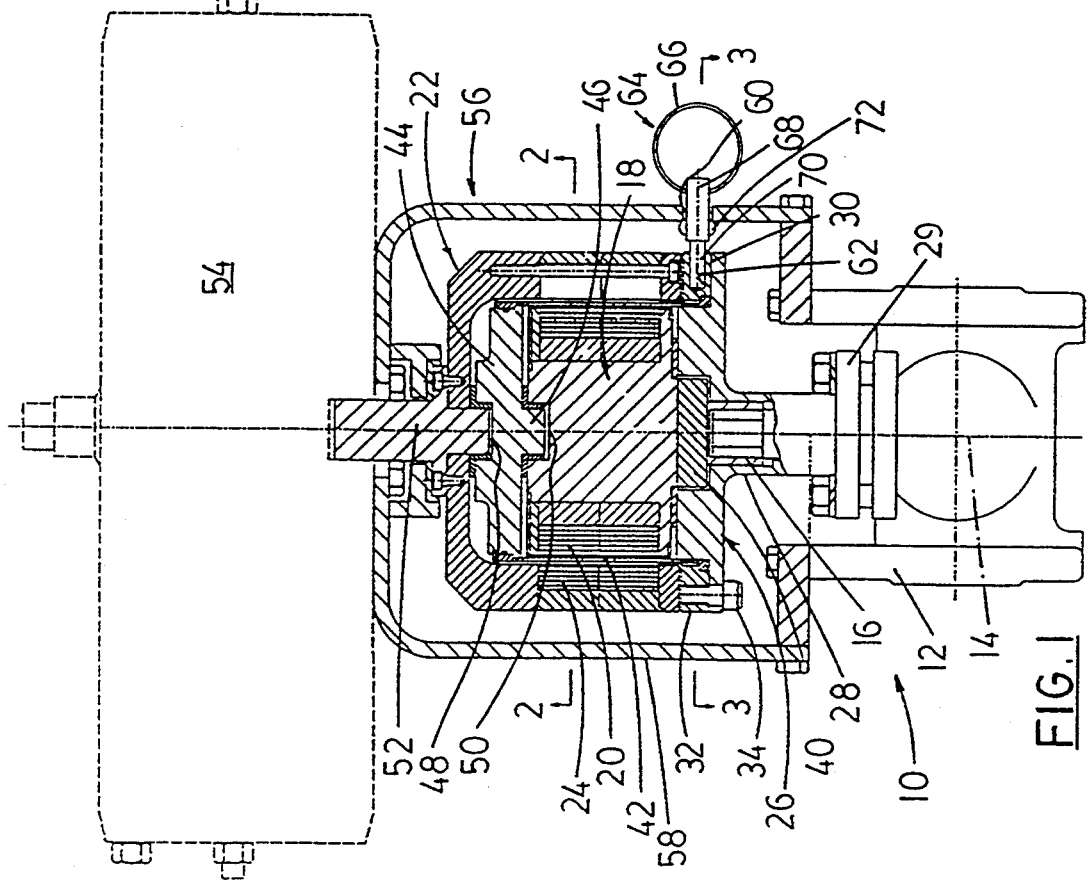
FIG. 1 shows a partial vertical section through a valve incorporating the override system of the present invention.

FIG. 1 illustrates a rotary magnetic valve 10 modified in accordance with the present invention. With reference also to FIG. 2 it is seen that the valve 10 includes a valve body 12 which is connectable at each end thereof to suitable conduits through which a fluid to be controlled will pass. The valve body 12 contains a rotatable valve member (not shown), such as a butterfly, which is rotatable on a rotation axis 14. A valve stem 16 extends from the valve member on the rotation axis and is connected to or is part of a cylindrical first carrier member 18 which has driven rare earth magnets 20 mounted thereon about its outer periphery as seen in FIGS. 1 and 2. The details of the mounting of such magnets are not necessary for a full understanding of the present invention, reference to Canadian Patent No. 1,092,589 being suggested for such details if necessary. Peripherally adjacent magnets are of opposite polarity.

An inverted cup-shaped second or external carrier member 22 has a plurality of rare earth magnets 24 mounted on the inner periphery thereof, each magnet 24 being radially alignable with a corresponding magnet 20 as seen in FIG. 2. As with the magnets 20 peripherally adjacent magnets 24 are of opposite polarity.

Figure 3:
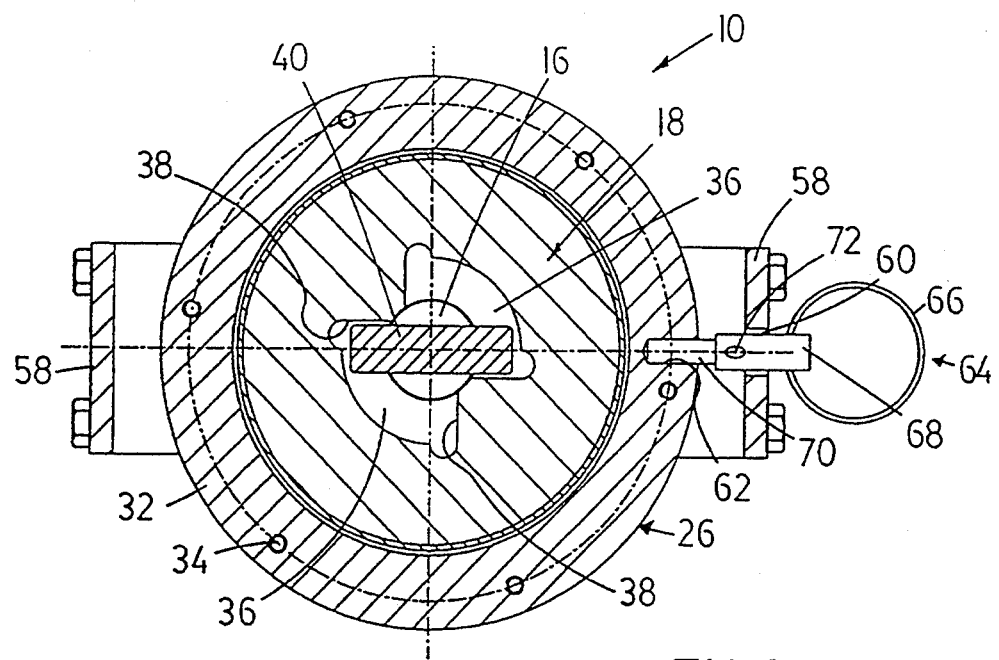
FIG. 3 shows a section on the line 3—3 of FIG. 1.
Figure 5:
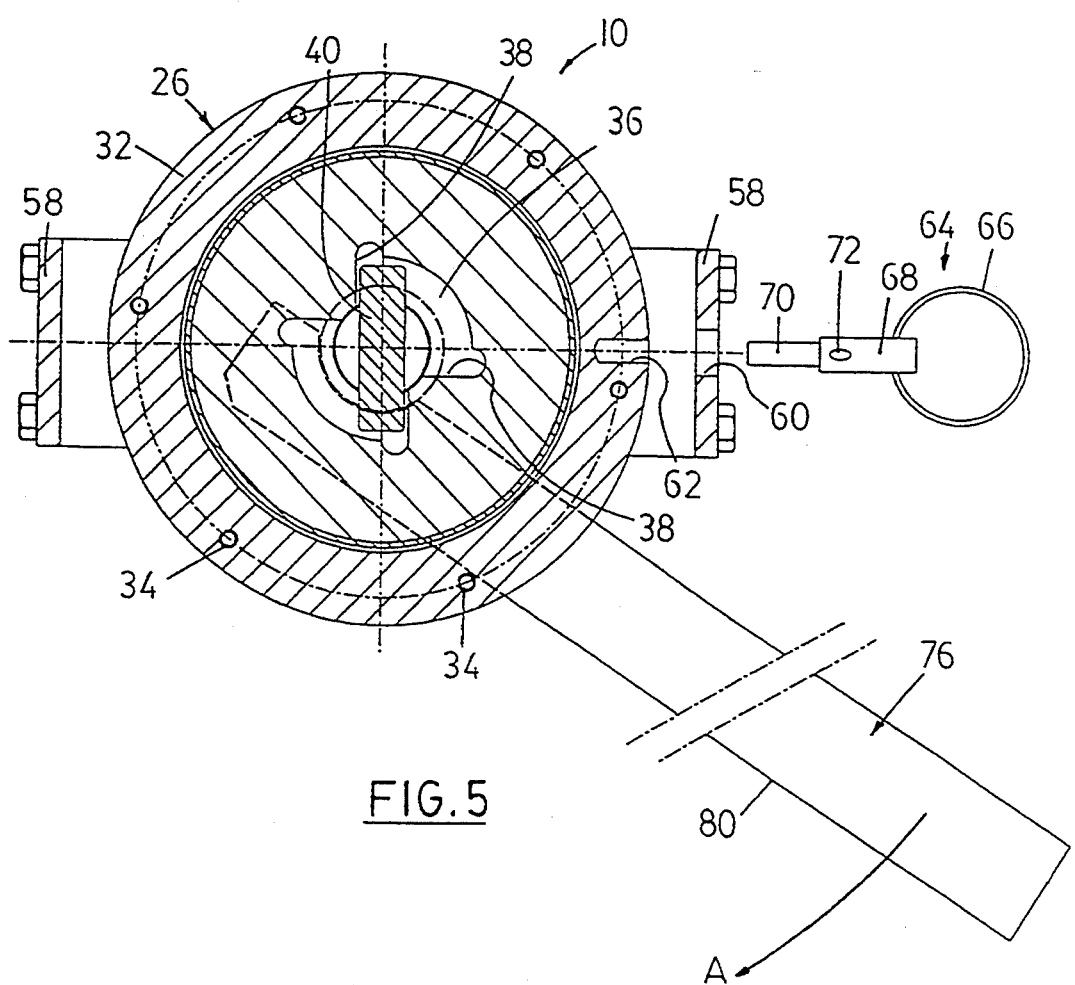
FIG. 5 shows a section similar to that of FIG. 3 but with the invention in operation.

Concentrically mounted exteriorly of the valve stem 16 is a circular plate member 26 having an annular depending boss or shaft portion 28 that is journalled on the valve stem 16. The boss portion 28 extends downwardly to meet the top of the valve body 12 to which it is attached with a sealed interface 29. The sealed interface 29 is constructed so that, while static in normal operation, it will allow rotation about its axis in an emergency. The plate member 26 has an annular outer recessed shoulder portion 30 to which an annular ring 32 is bolted by circumferentially spaced bolts 34 (see FIGS. 1, 3 and 5). With reference to FIGS. 3 and 5 it is seen that the plate member 26 has a pair of diametrically opposed preferably arcuate recesses 36 extending over about 90°. Each recess 36 has a flat wall 38 at each end thereof. The valve stem 16 carries a solid, strong diametrically extending pin 40 which projects at each end thereof beyond the stem 16 into the adjacent recess 36. Together, the recesses 36 and the pin 40 define cooperating means which constitute rotation limit means for the valve. Although the pin 40 is shown as extending at each end into an adjacent recess 36 it should be understood that a pin projecting beyond the valve stem only at one end into a single recess contained in the plate member could be used if desired.

The annular ring 32 clamps a barrier member 42 to the plate member 26 so as to hermetically seal the barrier member to the plate member. The cylindrical barrier member 42 separates the driven magnets 20 from the drive magnets 24 and includes a disc-like end wall 44 which has opposed axial boss and counterbore portions 46,48 respectively. The boss portion 46 is journalled in a counterbore 50 of the carrier 18 so that the carrier 18 can easily rotate within the barrier member 42. The counterbore portion 48 receives the cylindrical end of a drive-member 52 which is bolted to the external carrier 22 and in turn is connected to a suitable valve actuator 54 such as a servo motor or other appropriate means.

A support member 56 in the form of a pair of straps 58 has its upper ends bolted to the drive member 54 and its lower ends bolted to the valve body 12 as best seen in FIG. 1. One of the straps 58 has a hole 60 extending therethrough, the hole 60 lining up with a radial bore 62 in the annular ring 32. A retaining pin 64 has a pull ring 66 attached to a central cylindrical portion 68 which in turn terminates in a smaller cylindrical portion 70. Portion 68 has a pair of protrusions 72 which can be spring loaded or made retractable so that portion 68 may fit into hole 60. The retaining pin thus described is commercially available and is shown here as an example of an appropriate retaining means, it being understood that other functionally equivalent means could be used.

When the pin 64 is inserted through the hole 60 so that the portion 70 fits in the bore 62 it will hold the plate member 26 rotationally stationary relative to the valve body 12. The protrusions 72 will engage the rear face of the strap 58 so as to prevent the pin 64 from inadvertently slipping out of engagement with the bore 62.

With the valve assembly having its components in place as seen in FIGS. 1-3 the drive carrier can be actuated so as to rotate on the axis 14. Due to magnetic interaction across the barrier 42 the driven carrier will follow the drive carrier and rotate the valve member in the desired direction. The plate member 26 is held stationary by the pin 64 and hence the valve member is constrained to rotate between rotational limits determined by interaction between the pin 40 and the end walls 38 of the recesses 36.

In the event that the valve member jams and there is not sufficient magnetically induced torque to rotate the valve member one will first of all remove the pin 64 by pulling it radially away from the bore 62 via the ring 66. This is shown in FIG. 5, the pin having been completely removed from its interengaging position between the strap 58 and the plate member 26. The protrusion 72 will compress inwardly during the removal step to allow complete removal of the pin.

With the pin 64 removed one then applies a lever member 76 as seen in FIG. 4 to rotate the plate member 26. The lever is a rectangular member having an arcuate cutout 78 in one edge adjacent one end, and a straight opposite edge 80. The cutout 78 is mated to the cylindrical boss 28 of the plate member 26 and the edge 80 is pushed against a suitable abutment such as the head of one of the bolts 34. A force normal to the length of the lever 76 is applied at the outer end thereof as seen in FIG. 5 (arrow A) to cause the plate member 26 to rotate relative to the valve body 12. This brings one set of end walls 38 of the recesses 36 into contact with the projecting ends of the pin 40. Continued force application transfers rotative movement from the plate member 26 to the pin 40 and therethrough to the valve stem. It should be possible to apply sufficient force through the lever 76 to overcome the forces causing the valve member to jam and to move the valve member to an open or a closed condition as desired. Applying the lever 76 in a manner opposite to that shown and applying a force opposite to the arrow A would effect rotation in the opposite direction to move the valve member to an open or closed condition as required. Once the valve member has been moved to its desired condition it should be possible to shut down the fluid flow elsewhere so that the fault which caused the valve member to jam in the first place can be corrected. When the valve is ready to be put back into service the pin 64 will be reinserted through hole 60 to engage with the bore 62 and to again hold the plate member 26 stationary with respect to the valve body 12.

It should be noted that during the described emergency manual operation, when the plate member 26 and its cylindrical boss 28 are rotated, the sealed interface 29 is made to rotate. Normally, this sealed interface 29 is static and will likely operate in this condition for many years. It is only during the emergency manual operation that the interface 29 is required to rotate with respect to the valve body 12, and even then it is rotated slowly and only through a fraction of a turn, depending on what is required to open or close the valve.

As indicated hereinabove many details respecting the valve assembly have been omitted as being unnecessary to a complete understanding of the invention. It will be appreciated that seals and/or bearing members will be required between certain elements of the assembly but the nature thereof will be determined by the environment in which the valve assembly is to be used. It will also be appreciated that other alternative constructions could be used without departing from the spirit of the invention. For example the rotation limit means could take the form shown in FIG. 6A wherein the plate member 26 carries at least one axially extending pin 82 which is matable in an arcuate recess 84 in the bottom wall 86 of the internal carrier 18. When an end wall 88 of the recess 84 engages or abuts the pin 82 the carrier 18 will be at its rotation limit. Rotation of the plate member 26 by the lever member 76 will first of all bring the pin 82 into contact with an end wall 88, with continued rotation of the plate member applying a rotative force to the internal carrier and then to the valve stem and the valve member. Of course, the location of the pin(s) 82 and the recess(es) 84 could be reversed, with the pin(s) depending from the carrier 18 and the recess(es) being in the upper surface of the plate member 26, as in FIG. 6B.

Other changes could be effected by a skilled practitioner in the art without departing from the essence of the invention. Thus the protection to be afforded this invention is to be ascertained from the claims appended hereto.

The embodiments of the invention in which an exclusive property or privilege is claimed are defined as follows:

1. A manual override system for a rotary magnetically operated valve assembly having a valve member rotatably located in a valve body on a rotation axis, a first carrier member connected to said valve member and mounting a peripheral set of driven magnets, a barrier member surrounding said carrier member and being hermetically sealed to a rotatable lower plate member of said assembly, a second carrier member surrounding said barrier member and mounting a set of drive magnets for magnetically inducing following rotary movement in said first carrier member and said valve member in response to specific rotary movement of said second carrier member, and rotation limit means cooperatively provided on said lower plate member and said first carrier member, said manual override system comprising: a support member fixed to said valve body; disengageable means normally interconnecting said support member and said lower plate member to hold said lower plate member stationary; and lever means engageable with said lower plate member following disengagement of said disengageable means for forcing rotation of said lower plate member and consequent rotation of said valve member through said limit means in the event that said drive magnets are unable to effect rotary movement of said driven magnets.

2. The system of claim 1 wherein said first carrier member includes a valve stem that interconnects the first carrier member and said valve member, said rotation limit means comprising a pin extending diametrically beyond said valve stem and at least one cooperating recess in said lower plate member, said recess having end walls against which said pin will abut at the rotation limits of said valve member.

3. The system of claim 2 wherein said pin extends diametrically at each end thereof beyond said valve stem, there being a recess in said lower plate member for each said end of said pin.

4. The system of claim 3 wherein said disengageable means is a retaining member extendable through and lockable with said support member, said retaining member being receivable in a corresponding bore in said lower plate member.

5. The system of claim 4 wherein said lower plate member includes an annular plate having an annular outer recessed shoulder portion, an annular ring on said shoulder and affixed thereto by a plurality of circumferentially spaced bolts, said bore extending radially into said ring, and a depending boss portion bearingly surrounding said valve stem.

6. The system of claim 5 wherein said lever means comprises an elongated lever arm having an arcuate cutout in one edge thereof matable with said depending boss portion, the opposite edge of said lever arm being engageable with a head of one of said bolts for pushing thereagainst and effecting rotation of said lower plate member.

7. The system of claim 1 wherein said lower plate member includes a depending boss portion and said lever means comprises an elongated lever arm having an arcuate cutout in one edge thereof matable with said depending boss portion, the opposite edge of said lever arm being engageable with abutment means adjacent the outer periphery of said lower plate member for pushing against said abutment means and effecting rotation of said lower plate member.

8. The system of claim 7 wherein said rotation limit means comprises at least one pin extending parallel to said rotation axis from said first carrier member or said lower plate member into a corresponding arcuate recess in said lower plate member or said first carrier member, said recess having end walls against which said pin will abut at the rotation limits of said valve member.

9. The system of claim 8 wherein said disengageable means is a pin member extendable through and lockable with said support member, said pin member being receivable in a corresponding bore in said lower plate member.

* * * * *